United States Patent
Schumacher et al.

(10) Patent No.: US 8,123,899 B2
(45) Date of Patent: Feb. 28, 2012

(54) POLYURETHANE ADHESIVE WITH A SILANE COMPOUND AS AN ADDITIVE

(75) Inventors: Karl-Heinz Schumacher, Neustadt (DE); Oliver Hartz, Limburgerhof (DE); Andre Burghardt, Konstancin Jeziorna (PL)

(73) Assignee: BASF Aktiengesellschaft, Ludwigshafen (DE)

( * ) Notice: Subject to any disclaimer, the term of this patent is extended or adjusted under 35 U.S.C. 154(b) by 495 days.

(21) Appl. No.: 12/373,296

(22) PCT Filed: Jul. 3, 2007

(86) PCT No.: PCT/EP2007/056666
§ 371 (c)(1),
(2), (4) Date: Jan. 12, 2009

(87) PCT Pub. No.: WO2008/006733
PCT Pub. Date: Jan. 17, 2008

(65) Prior Publication Data
US 2009/0194232 A1 Aug. 6, 2009

(30) Foreign Application Priority Data

Jul. 12, 2006 (EP) .................... 06117069

(51) Int. Cl.
*C09J 7/02* (2006.01)
*C08F 283/04* (2006.01)
*C08G 18/48* (2006.01)
(52) U.S. Cl. ......... 156/329; 525/453; 525/454; 525/458
(58) Field of Classification Search .................. 156/329; 525/453, 454, 458
See application file for complete search history.

(56) References Cited

U.S. PATENT DOCUMENTS

| | | | |
|---|---|---|---|
| 3,763,274 A | 10/1973 | Wang et al. | |
| 5,041,494 A | 8/1991 | Franke et al. | |
| 6,077,901 A * | 6/2000 | Roesler et al. | 524/588 |
| 6,797,764 B2 * | 9/2004 | Sagiv et al. | 524/501 |
| 7,041,720 B2 | 5/2006 | Aydin et al. | |
| 2002/0002232 A1 | 1/2002 | Sagiv et al. | |

FOREIGN PATENT DOCUMENTS

| | | |
|---|---|---|
| DE | 42 15 648 A1 | 11/1993 |
| EP | 0 163 214 A2 | 12/1985 |
| EP | 0 315 006 A2 | 5/1989 |
| EP | 0 383 015 A2 | 8/1990 |
| EP | 0 443 537 A2 | 8/1991 |
| EP | 0 721 001 A1 | 7/1996 |
| EP | 1 479 744 A1 | 11/2004 |
| EP | 1 544 226 A2 | 6/2005 |
| JP | 2005-272592 | 10/2005 |
| WO | WO 01/77248 A1 | 10/2001 |
| WO | WO 2005/005565 A1 | 1/2005 |

* cited by examiner

*Primary Examiner* — Philip Tucker
*Assistant Examiner* — Michael Orlando
(74) *Attorney, Agent, or Firm* — Oblon, Spivak, McClelland, Maier & Neustadt, L.L.P.

(57) ABSTRACT

Aqueous adhesive comprising a polyurethane and a silane of the formula

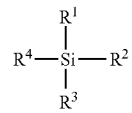

where $R^1$ to $R^4$ each independently are an organic radical, with the proviso that at least two of the groups $R^1$ to $R^4$ are a hydroxyl or alkoxy group.

13 Claims, No Drawings

POLYURETHANE ADHESIVE WITH A SILANE COMPOUND AS AN ADDITIVE

CROSS-REFERENCE TO RELATED APPLICATIONS

The present application is a 35 U.S.C. §371 National Stage patent application of International patent application PCT/EP07/56666, filed on Jul. 3, 2007, which claims priority to German patent application 06117069.2, filed on Jul. 12, 2006.

The invention relates to an aqueous adhesive comprising a polyurethane and a silane of the formula

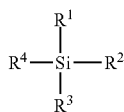

where $R^1$ to $R^4$ each independently are an organic radical, with the proviso that at least two of the groups $R^1$ to $R^4$ are a hydroxyl or alkoxy group.

Aqueous polyurethane dispersions are used as adhesives, not least as laminating adhesives, in the automobile or furniture industry, for example.

For industrial lamination of this kind a high heat resistance is particularly important, and the bond ought also to retain its strength at high temperatures for as long a time as possible.

Polyurethanes containing carbodiimide groups or polyurethane dispersions comprising carbodiimide additives are used for industrial lamination, as WO 2005/05565 describes.

Polyurethanes comprising alkoxysilane groups attached to the polyurethane backbone are described for example in EP-A 163 214 or EP-A 315 006; DE-A 42 15 648 relates to the use of such polyurethanes containing alkoxy groups as a contact adhesive.

Aqueous adhesives which comprise silane additives are known from EP-A 1 479 744. The adhesive, though, comprises a polyacrylate, rather than a polyurethane, as binder.

It was an object of the invention further to improve the performance properties of polyurethane dispersions for industrial lamination; in particular, the intention is that the heat resistance should be very good indeed. The adhesives should store stably and be extremely simple to prepare.

Found accordingly has been the aqueous adhesive defined above.

The Polyurethane

The aqueous adhesive comprises a polyurethane as binder.

With a suitable preference a polyurethane is one composed predominantly of polyisocyanates, especially diisocyanates, and, as co-reactants, polyesterdiols, polyetherdiols or mixtures thereof.

The polyurethane is preferably synthesized from at least 40%, more preferably at least 60%, and very preferably at least 80% by weight of diisocyanates, polyetherdiols and/or polyesterdiols.

With preference the polyurethane comprises polyesterdiols in an amount of more than 10%, more preferably greater than 30%, in particular greater than 40% or greater than 50%, very preferably greater than 60%, by weight, based on the polyurethane.

Polyesterdiols in particular are used as synthesis components; if polyesterdiols are used in a mixture with polyetherdiols, the proportion of polyesterdiols is preferably at least 50 mol %, more preferably at least 80 mol %, very preferably 100 mol %, of the mixture of polyesterdiols and polyetherdiols.

Preferably the polyurethane has a melting point greater than 30° C., in particular greater than 40° C., more preferably greater than 50° C. or greater than 60° C. or greater than 70° C.; in general the melting point is not greater than 150° C., in particular not greater than 100° C. The melting point is situated therefore in particular in a range from 30 to 150° C., more preferably from 40 to 150° C., and very preferably from 30 to 100° C., and in particular from 50 to 80° C.

The polyurethane preferably has a melting enthalpy of more than 20 J/g.

The measurement of the melting point and of the melting enthalpy takes place by the method of differential scanning calorimetry.

The measurement takes place on polyurethane films 200 µm thick which prior to measurement have been dried in a forced-air drying oven at 40° C. for 72 hours. In preparation for the measurement, approximately 13 mg of the polyurethane are introduced into pans. The pans are sealed, the samples are heated to 120° C., cooled at 20 K/min and conditioned at 20° C. for 20 hours. The samples prepared in this way are subjected to measurement in accordance with the DSC method of DIN 53765, the sample being heated at 20 K/min. The melting temperature is the peak temperature to DIN 53765; the melting enthalpy is determined as in picture 4 of DIN 53765.

Overall the polyurethane is preferably synthesized from
a) diisocyanates,
b) diols of which
  b1) 10 to 100 mol %, based on the total amount of diols (b), have a molecular weight of 500 to 5000 g/mol,
  b2) 0 to 90 mol %, based on the total amount of diols (b), have a molecular weight of 60 to 500 g/mol,
c) non-(a) and non-(b) monomers containing at least one isocyanate group or at least one group reactive toward isocyanate groups, and further carrying at least one hydrophilic or potentially hydrophilic group to make the polyurethanes dispersible in water,
d) if appropriate, further, non-(a) to non-(c) polyfunctional compounds containing reactive groups selected from hydroxyl groups, mercapto groups, primary or secondary amino groups or isocyanate groups, and
e) if appropriate, non-(a) to non-(d) monofunctional compounds containing a reactive group which is a hydroxyl group, a primary or secondary amino group or an isocyanate group.

Particular mention may be made as monomers (a) of diisocyanates $X(NCO)_2$, where X is an aliphatic hydrocarbon radical having 4 to 15 carbon atoms, a cycloaliphatic or aromatic hydrocarbon radical having 6 to 15 carbon atoms, or an araliphatic hydrocarbon radical having 7 to 15 carbon atoms. Examples of such diisocyanates include tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)-propane, trimethylhexane diisocyanate, 1,4-diisocyanatobenzene, 2,4-diisocyanatotoluene, 2,6-diisocyanatotoluene, 4,4'-diisocyanato-diphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomers, and mixtures of these compounds.

Diisocyanates of this kind are available commercially.

Particularly important mixtures of these isocyanates are the mixtures of the respective structural isomers of diisocyanatotoluene and diisocyanatodiphenylmethane; the mixture of 80 mol % 2,4-diisocyanatotoluene and 20 mol % 2,6-diisocyanatotoluene is particularly suitable. Also of particular advantage are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, in which case the preferred mixing ratio of the aliphatic to the aromatic isocyanates is from 4:1 to 1:4. Compounds used to synthesize the polyurethanes, in addition to those mentioned above, also include isocyanates which in addition to the free isocyanate groups carry further, blocked isocyanate groups, e.g., uretdione groups.

With a view to effective film-forming and elasticity, suitable diols (b) are principally relatively high molecular weight diols (b1), having a molecular weight of from about 500 to 5000, preferably from about 1000 to 3000 g/mol. The molecular weight in question is the number-average molar weight Mn. Mn is obtained by determining the number of end groups (OH number).

The diols (b1) may be polyesterpolyols, which are known, for example, from Ullmanns Enzyklopädie der technischen Chemie, 4th edition, volume 19, pp. 62 to 65. It is preferred to use polyesterpolyols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyesterpolyols. The polycarboxylic acids can be aliphatic, cycloaliphatic, araliphatic, aromatic or heterocyclic and can, if appropriate, be substituted by halogen atoms for example, and/or unsaturated. Examples thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preferred dicarboxylic acids are those of the general formula $HOOC-(CH_2)_y-COOH$, where y is a number from 1 to 20, preferably an even number from 2 to 20, examples being succinic acid, adipic acid, sebacic acid, and dodecanedicarboxylic acid.

Examples of suitable polyhydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)-cyclohexane, 2-methylpropane-1,3-diol, methylpentanediols, and also diethylene glycol, triethylene glycol, tetraethylene glycol, polyethylene glycol, dipropylene glycol, polypropylene glycol, and dibutylene glycol and polybutylene glycols. Preferred alcohols are those of the general formula $HO-(CH_2)_x-OH$, where x is a number from 1 to 20, preferably an even number from 2 to 20. Examples of such alcohols include ethylene glycol, butane-1,4-diol, hexane-1,6-diol, octane-1,8-diol, and dodecane-1,12-diol. Preference is also given to neopentyl glycol.

Suitability is also possessed by polycarbonatediols, such as may be obtained, for example, by reacting phosgene with an excess of the low molecular weight alcohols specified as synthesis components for the polyesterpolyols.

It may also be possible, if appropriate, to use lactone-based polyesterdiols, which are homopolymers or copolymers of lactones, preferably hydroxy-terminated adducts of lactones with suitable difunctional starter molecules. Preferred lactones are those derived from compounds of the general formula $HO-(CH_2)_z-COOH$, where z is a number from 1 to 20 and where one hydrogen atom of a methylene unit may also be substituted by a $C_1$ to $C_4$ alkyl radical. Examples are ε-caprolactone, β-propiolactone, γ-butyrolactone and/or methyl-ε-caprolactone, and mixtures thereof. Examples of suitable starter components are the low molecular weight dihydric alcohols specified above as a synthesis component for the polyesterpolyols. The corresponding polymers of ε-caprolactone are particularly preferred. Lower polyesterdiols or polyetherdiols as well can be used as starters for preparing the lactone polymers. Instead of the polymers of lactones it is also possible to use the corresponding chemically equivalent polycondensates of the hydroxycarboxylic acids corresponding to the lactones.

Polyetherdiols are obtainable in particular by polymerizing ethylene oxide, propylene oxide, butylene oxide, tetrahydrofuran, styrene oxide or epichlorohydrin with itself, in the presence of $BF_3$ for example, or by subjecting these compounds, if appropriate in a mixture or in succession, to addition reaction with starter components containing reactive hydrogen atoms, such as alcohols or amines, examples being water, ethylene glycol, propane-1,2-diol, propane-1,3-diol, 2,2-bis(4-hydroxyphenyl)propane, and aniline. Particular preference is given to polypropylene oxide, polytetrahydrofuran with a molecular weight of from 240 to 5000, and in particular of from 500 to 4500.

Compounds subsumed under b1) include only those polyetherdiols composed to an extent of less than 20% by weight of ethylene oxide. Polyetherdiols with at least 20% by weight are hydrophilic polyetherdiols, which are counted as monomers c).

It may also be possible, if appropriate, to use polyhydroxyolefins, preferably those having 2 terminal hydroxyl groups, e.g., α,ω-dihydroxypolybutadiene, α,ω-dihydroxypolymethacrylic esters or α,ω-dihydroxypolyacrylic esters, as monomers (c1). Such compounds are known for example from EP-A 622 378. Further suitable polyols are polyacetals, polysiloxanes, and alkyd resins.

Preferably at least 30 mol %, more preferably at least 70 mol %, of the diols b1) are polyesterdiols. With particular preference polyesterdiols exclusively are used as diols b1).

The hardness and the elasticity modulus of the polyurethanes can be increased by using as diols (b) not only the diols (b1) but also low molecular weight diols (b2) having a molecular weight of from about 60 to 500, preferably from 62 to 200 g/mol.

Monomers (b2) used are in particular the synthesis components of the short-chain alkanediols specified for preparing polyesterpolyols, preference being given to unbranched diols having 2 to 12 carbon atoms and an even number of carbon atoms, and also to pentane-1,5-diol and neopentyl glycol.

Examples of suitable diols b2) include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, additionally diethylene glycol, triethylene glycol, tetraethylene glycol, polyethylene glycol, dipropylene glycol, polypropylene glycol, dibutylene glycol, and polybutylene glycols. Preference is given to alcohols of the general formula $HO-(CH_2)_x-OH$, where x is a number from 1 to 20, preferably an even number from 2 to 20. Examples thereof are ethylene glycol, butane-1,4-diol, hexane-1,6-diol, octane-1,8-diol, and dodecane-1,12-diol. Preference is further given to neopentyl glycol.

The fraction of diols (b1), based on the total amount of diols (b), is preferably from 10 to 100 mol %, and the fraction of the monomers (b2), based on the total amount of diols (b), is preferably from 0 to 90 mol %. With particular preference the ratio of the diols (b1) to the monomers (b2) is from 0.1:1 to 5:1, more preferably from 0.2:1 to 2:1.

In order to make the polyurethanes dispersible in water they comprise as synthesis components non-(a), non-(b), and non-(d) monomers (c), which carry at least one isocyanate group or at least one group reactive toward isocyanate groups and, furthermore, at least one hydrophilic group or a group which can be converted into a hydrophilic group. In the text below; the term "hydrophilic groups or potentially hydrophilic groups" is abbreviated to "(potentially) hydrophilic groups". The (potentially) hydrophilic groups react with isocyanates at a substantially slower rate than do the functional groups of the monomers used to synthesize the polymer main chain. The fraction of the components having (potentially) hydrophilic groups among the total quantity of components (a), (b), (c), (d), and (e) is generally such that the molar amount of the (potentially) hydrophilic groups, based on the amount by weight of all monomers (a) to (e), is from 30 to 1000, preferably from 50 to 500, and more preferably from 80 to 300 mmol/kg.

The (potentially) hydrophilic groups can be nonionic or, preferably, (potentially) ionic hydrophilic groups.

Particularly suitable nonionic hydrophilic groups are polyethylene glycol ethers composed of preferably from 5 to 100, more preferably from 10 to 80 repeating ethylene oxide units. The amount of polyethylene oxide units is generally from 0 to 10% by weight, preferably from 0 to 6% by weight, based on the amount by weight of all monomers (a) to (e).

Preferred monomers containing nonionic hydrophilic groups are polyethylene oxide diols containing at least 20% by weight of ethylene oxide, polyethylene oxide monools, and the reaction products of a polyethylene glycol and a diisocyanate which carry a terminally etherified polyethylene glycol radical. Diisocyanates of this kind and processes for preparing them are specified in U.S. Pat. No. 3,905,929 and U.S. Pat. No. 3,920,598.

Ionic hydrophilic groups are, in particular, anionic groups such as the sulfonate, the carboxylate, and the phosphate group in the form of their alkali metal salts or ammonium salts, and also cationic groups such as ammonium groups, especially protonated tertiary amino groups or quaternary ammonium groups.

Potentially ionic hydrophilic groups are, in particular, those which can be converted into the abovementioned ionic hydrophilic groups by simple neutralization, hydrolysis or quaternization reactions, in other words, for example, carboxylic acid groups or tertiary amino groups.

(Potentially) ionic monomers (c) are described at length in, for example, Ullmanns Enzyklopädie der technischen Chemie, 4th edition, volume 19, pp. 311-313 and in, for example, DE-A 14 95 745.

Of particular practical importance as (potentially) cationic monomers (c) are, in particular, monomers containing tertiary amino groups, examples being tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkylamines, the alkyl radicals and alkanediyl units of these tertiary amines consisting independently of one another of 1 to 6 carbon atoms. Also suitable are polyethers containing tertiary nitrogen atoms and preferably two terminal hydroxyl groups, such as are obtainable in a conventional manner, for example, by alkoxylating amines containing two hydrogen atoms attached to amine nitrogen, such as methylamine, aniline or N,N'-dimethylhydrazine. Polyethers of this kind generally have a molar weight of between 500 and 6000 g/mol.

These tertiary amines are converted into the ammonium salts either with acids, preferably strong mineral acids such as phosphoric acid, sulfuric acid, hydrohalic acids, or strong organic acids, or by reaction with suitable quaternizing agents such as $C_1$ to $C_6$ alkyl halides or benzyl halides, e.g., bromides or chlorides.

Suitable monomers having (potentially) anionic groups normally include aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids, especially those having 3 to 10 carbon atoms, such as are also described in U.S. Pat. No. 3,412,054. Particular preference is given to compounds of the general formula (c1)

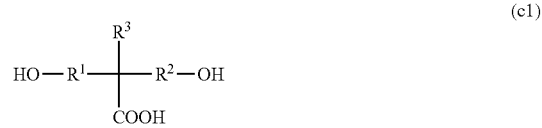

(c1)

in which $R^1$ and $R^2$ are a $C_1$ to $C_4$ alkanediyl (unit) and $R^3$ is a $C_1$ to $C_4$ alkyl (unit), and especially to dimethylolpropionic acid (DMPA).

Also suitable are corresponding dihydroxysulfonic acids and dihydroxyphosphonic acids such as 2,3-dihydroxypropanephosphonic acid.

Otherwise suitable are dihydroxyl compounds having a molecular weight of more than 500 to 10 000 g/mol and at least 2 carboxylate groups, which are known from DE-A 39 11 827. They are obtainable by reacting dihydroxyl compounds with tetracarboxylic dianhydrides such as pyromellitic dianhydride or cyclopentanetetracarboxylic dianhydride in a molar ratio of from 2:1 to 1.05:1 in a polyaddition reaction. Particularly suitable dihydroxyl compounds are the monomers (b2) cited as chain extenders and also the diols (b1).

Suitable monomers (c) containing amino groups reactive toward isocyanates include aminocarboxylic acids such as lysine, β-alanine or the adducts of aliphatic diprimary diamines with α,β-unsaturated carboxylic or sulfonic acids that are specified in DE-A 20 34 479.

Such compounds obey, for example, the formula (c2)

(c2)

where
$R^4$ and $R^5$ independently of one another are a $C_1$ to $C_6$ alkanediyl unit, preferably ethylene
and X is COOH or $SO_3H$.

Particularly preferred compounds of the formula (c2) are N-(2-aminoethyl)-2-aminoethanecarboxylic acid and also N-(2-aminoethyl)-2-aminoethanesulfonic acid and the corresponding alkali metal salts, with Na being a particularly preferred counterion. Also particularly preferred are the adducts of the abovementioned aliphatic diprimary diamines with 2-acrylamido-2-methylpropanesulfonic acid, as described for example in DE-B 1 954 090.

Where monomers with potentially ionic groups are used, their conversion into the ionic form may take place before, during or, preferably, after the isocyanate polyaddition, since the ionic monomers are frequently difficult to dissolve in the reaction mixture. Examples of neutralizing agents include ammonia, NaOH, triethanolamine (TEA), triisopropylamine (TIPA) or morpholine, or its derivatives. The sulfonate or carboxylate groups are particularly preferably in the form of their salts with an alkali metal ion or ammonium ion as counterion.

The polyurethane comprises preferably anionic groups, especially sulfonate groups, and with particular preference carboxylate groups.

The monomers (d), which are different from the monomers (a) to (c) and which may, if appropriate, also be part of the polyurethane, serve generally for crosslinking or chain extension. They generally comprise nonphenolic alcohols with a functionality of more than 2, amines having 2 or more primary and/or secondary amino groups, and compounds which as well as one or more alcoholic hydroxyl groups carry one or more primary and/or secondary amino groups.

Alcohols having a functionality of more than 2, which may be used in order to set a certain degree of branching or crosslinking, include for example trimethylolpropane, glycerol, or sugars.

Also suitable are monoalcohols which as well as the hydroxyl group carry a further isocyanate-reactive group, such as monoalcohols having one or more primary and/or secondary amino groups, monoethanolamine for example.

Polyamines having 2 or more primary and/or secondary amino groups are used especially when the chain extension and/or crosslinking is to take place in the presence of water, since amines generally react more quickly than alcohols or water with isocyanates. This is frequently necessary when the desire is for aqueous dispersions of crosslinked polyurethanes or polyurethanes having a high molar weight. In such cases the approach taken is to prepare prepolymers with isocyanate groups, to disperse them rapidly in water, and then to subject them to chain extension or crosslinking by adding compounds having two or more isocyanate-reactive amino groups.

Amines suitable for this purpose are generally polyfunctional amines of the molar weight range from 32 to 500 g/mol, preferably from 60 to 300 g/mol, which contain at least two amino groups selected from the group consisting of primary and secondary amino groups. Examples of such amines are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane.

The amines can also be used in blocked form, e.g., in the form of the corresponding ketimines (see for example CA-A 1 129 128), ketazines (cf. e.g. U.S. Pat. No. 4,269,748) or amine salts (see U.S. Pat. No. 4,292,226). Oxazolidines as well, as used for example in U.S. Pat. No. 4,192,937, represent blocked polyamines which can be used for the preparation of the polyurethanes of the invention, for chain extension of the prepolymers. Where blocked polyamines of this kind are used they are generally mixed with the prepolymers in the absence of water and this mixture is then mixed with the dispersion water or with a portion of the dispersion water, so that the corresponding polyamines are liberated by hydrolysis.

It is preferred to use mixtures of diamines and triamines, more preferably mixtures of isophoronediamine (IPDA) and diethylenetriamine (DETA).

The polyurethanes comprise preferably from 1 to 30 mol %, more preferably from 4 to 25 mol %, based on the total amount of components (b) and (d), of a polyamine having at least 2 isocyanate-reactive amino groups as monomer (d).

For the same purpose it is also possible to use, as monomers (d), isocyanates having a functionality of more than two. Examples of standard commercial compounds are the isocyanurate or the biuret of hexamethylene diisocyanate.

Monomers (e), which are used if appropriate, are monoisocyanates, monoalcohols, and mono-primary and -secondary amines. Their fraction is generally not more than 10 mol %, based on the total molar amount of the monomers. These monofunctional compounds customarily carry further functional groups such as olefinic groups or carbonyl groups and serve to introduce into the polyurethane functional groups which facilitate the dispersing and/or the crosslinking or further polymer-analogous reaction of the polyurethane. Monomers suitable for this purpose include those such as isopropenyl-α, α-dimethylbenzyl isocyanate (TMI) and esters of acrylic or methacrylic acid such as hydroxyethyl acrylate or hydroxyethyl methacrylate.

Within the field of polyurethane chemistry it is general knowledge how the molecular weight of polyurethanes can be adjusted by selecting the proportions of the mutually reactive monomers and also the arithmetic mean of the number of reactive functional groups per molecule.

Components (a) to (e) and their respective molar amounts are normally chosen so that the ratio A:B, where
A is the molar amount of isocyanate groups and
B is the sum of the molar amount of the hydroxyl groups and the molar amount of the functional groups which are able to react with isocyanates in an addition reaction,
is from 0.5:1 to 2:1, preferably from 0.8:1 to 1.5, more preferably from 0.9:1 to 1.2:1. With very particular preference the ratio A:B is as close as possible to 1:1.

The monomers (a) to (e) employed carry on average usually from 1.5 to 2.5, preferably from 1.9 to 2.1, more preferably 2.0 isocyanate groups and/or functional groups which are able to react with isocyanates in an addition reaction.

The polyaddition of components (a) to (e) for preparing the polyurethane takes place at reaction temperatures of up to 180° C., preferably up to 150° C., under atmospheric pressure or under the autogenous pressure.

The preparation of polyurethanes, and of aqueous polyurethane dispersions, is known to the skilled worker.

The Silane

The silane has the formula

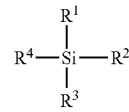

in which $R^1$ to $R^4$ each independently are an organic radical, with the proviso that at least two groups $R^1$ to $R^4$ are a hydroxyl group or alkoxy group.

Preferably two or three, more preferably three, of the groups $R^1$ to $R^4$ are a hydroxyl group or an alkoxy group. In general they are alkoxy groups; in the course of the subsequent use, the alkoxy groups then undergo hydrolysis to form hydroxyl groups, which then react further, or crosslink.

The group in question is in particular a $C_1$ to $C_9$, preferably a $C_1$ to $C_6$, more preferably a $C_1$ to $C_3$ alkoxy group, with very particular preference a methoxy or ethoxy group, and in particular a methoxy group.

The remaining groups $R^1$ to $R^4$ are any desired organic radical whose molar weight is generally less than 500 g/mol, in particular less than 200 g/mol, with particular preference less than 150 or less than 100 g/mol.

The remaining groups $R^1$ to $R^4$ may be, for example, aliphatic or aromatic hydrocarbon groups, or hydrocarbon groups containing not only aliphatic, including cycloaliphatic, but also aromatic constituents.

In one particular embodiment at least one of the remaining groups $R^1$ to $R^4$ is an organic radical which comprises at least one functional group selected from a primary or secondary amino group, an acid group, acid anhydride group, carbamate group, hydroxyl group, isocyanate group or an epoxy group.

Particularly preferred functional groups are the primary or secondary amino group, epoxy group, especially glycidyl group, or the carbamate group. Particular preference is given to the epoxy group, especially glycidyl group.

The remaining groups $R^1$ to $R^4$ may also comprise two or more functional groups, examples being two primary amino groups, two secondary amino groups, or one primary and one secondary amino group.

In preferred silanes, three of the radicals $R^1$ to $R^4$ are a hydroxyl or alkoxy group (preferably alkoxy group; see above) and the one remaining radical is an organic radical having at least one functional group. Likewise preferred are silanes in which two of the radicals $R^1$ to $R^4$ are a hydroxyl or alkoxy group (preferably alkoxy group; see above) and the two remaining radicals are each an organic radical having at least one functional group.

Suitable silanes are, in particular, of low molecular weight and have a molar weight below 5000, in particular below 2000, more preferably below 1000, and very preferably below 500 g/mol; the molar weight is generally above 50, in particular above 100, or 150 g/mol.

Examples of suitable silanes include
3-glycidyloxypropyltrimethoxysilane
3-glycidoxypropyltriethoxysilane
N-(2-aminoethyl)-3-aminopropyltrimethoxysilane
3-(triethoxysilyl)propylsuccinic anhydride
N-trimethoxysilylmethyl-O-methyl-carbamate The amount of the silanes in the aqueous adhesive is generally more than 1 part, in particular more than 2 parts, more preferably more than 5 parts by weight per 100 parts by weight of polyurethane; the amount of silanes is generally not more than 30 parts, in particular not more than 20 parts, with particular preference not more than 15 parts by weight per 100 parts by weight of polyurethane.

Further constituents of the aqueous adhesive

The adhesive of the invention is an aqueous adhesive.

A major constituent of the adhesive is the polyurethane as binder. The adhesive is composed preferably of at least 20%, more preferably of at least 30%, and very preferably at least 40%, and in particular at least 50% or at least 70% by weight of the polyurethane, based on the solids content (i.e., without water or other solvents liquid at 21° C. and 1 bar).

The adhesive may be composed solely of the polyurethane and or else of the silane, apart from water or other solvents which escape in drying; it may comprise further additives, examples being further binders, fillers, thickeners, wetting assistants, defoamers, and crosslinkers. Further additives can be added easily to the polyurethane or to the aqueous polyurethane dispersion.

Suitable further binders which may be used in the mixture with the polyurethane include, in particular, free-radically polymerized polymers, preferably in the form of their aqueous dispersions.

Polymers of this kind are composed preferably of at least 60% by weight of what are called principal monomers, selected from $C_1$ to $C_{20}$ alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds, or mixtures of these monomers. Polymers deserving particular mention are those synthesized from more than 60% by weight of $C_1$-$C_{20}$ alkyl (meth)acrylates (polyacrylates for short) or those composed of more than 60% by weight, including up to 100% by weight for example, of vinyl esters, especially vinyl acetate and ethylene (vinyl acetate/ethylene copolymer). Aqueous dispersions of copolymers composed of 15-25% by weight of ethylene and 75-85% by weight of vinyl acetate are particularly preferred as a blending component.

In one particular embodiment the adhesive comprises no binder other than the polyurethane.

The further constituents of the adhesive may also, for example, be further crosslinkers.

Suitable examples include chemically blocked isocyanates, encapsulated isocyanates, encapsulated uretdiones, biuretes or allophanates, or compounds containing carbodiimide groups.

The additional crosslinker may be attached to the polyurethane, or else may be a compound which is in solution or distribution in the polyurethane.

The adhesive requires no further crosslinkers in order to achieve the desired properties; preferably, therefore, the adhesive also comprises no further crosslinkers.

The solids content (all constituents besides water or other solvents liquid at 21° C. and 1 bar) is preferably between 20% and 80% by weight.

The Use

The adhesive of the invention may be used as a one-component (1K) or two-component (2K) adhesive. In the case of a 2K adhesive, a further additive is added prior to use, generally a crosslinker, e.g., an isocyanate compound or aziridine compound) or in the present case, the silane. A 1K adhesive already comprises the crosslinker or requires no crosslinkers or no further additives.

The adhesive of the invention as a 1K or 2K adhesive.

The adhesive of the invention is especially suitable as a laminating adhesive, i.e., for the permanent adhesive bonding of extensive substrates. The extensive substrates (substrates of large surface area) are selected in particular from polymer films, paper, metal foils or wood veneer, nonwoven webs of natural or synthetic fibers; they are bonded to one another or to other moldings, e.g., moldings of wood or plastic.

Particular preference is given to polymer films, e.g., films of polyester, such as polyethylene terephthalate, polyolefins such as polyethylene, polypropylene or polyvinyl chloride, of polyacetate. Particular preference is given to foamed PVC films and foamed thermoplastic polyolefin (TPO) films.

The moldings can also be moldings which are constructed from synthetic or natural fibers or chips which have been bound by a binder to form a molding; moldings of plastic, ABS for example, are among those especially suitable. The moldings may have any desired form.

The moldings or substrate to be bonded may have been pretreated; for example, they may have been coated with adhesion promoters.

The coating of the substrates or moldings with the adhesive can take place in accordance with typical application methods. Coating is followed by drying, preferably at room temperature or temperatures up to 80° C., in order to remove water or other solvents.

The amount of adhesive applied is preferably 0.5 to 100 g/m$^2$, more preferably 2 to 80 g/m$^2$, very preferably 10 to 70 g/m$^2$. Preference is given to unilateral coating of either the molding or a substrate to be bonded (film), though coating of both of the substrates to be bonded (bilateral coating), or of substrate and moldings is also appropriate.

When using 1K adhesives it is possible for the adhesive-coated substrate or molding to be stored; flexible substrates, for example, can be wound up into rolls.

When using a 2K adhesive it is possible to adopt a corresponding procedure, but preferably the molding is coated and not the film; after a short storage time (a few hours) the film ought to be laminated on.

For the purpose of adhesive bonding, the parts to be bonded are joined. The adhesive is then activated thermally. The temperature within the adhesive layer is preferably 20 to 200° C., more preferably 30 to 180° C.

Adhesive bonding takes place preferably under pressure, for which the parts to be bonded may be compressed with a pressure of 0.005 to 5 N/mm², for example. The assemblies obtained are distinguished by high mechanical strength even at elevated temperatures (heat stability) or under sharply altering climatic conditions (climatic stability).

The process of the invention has particular significance in the automotive, furniture or shoe industry, such as for the bonding of flexible substrates to interior automotive components, such as dashboards, inner door linings, and parcel shelves, or for producing foil-coated furniture, kitchen facings for example, or for bonding shoe parts to one another.

EXAMPLES

Materials Used

Silanes:
3-Glycidoxypropyltrimethoxysilane, Available as Geniosil® GF 80 from Wacker-Chemie GmbH.
3-glycidoxypropyltriethoxysilane, available as Geniosil® GF 82 from Firma Wacker-Chemie GmbH.
Other Crosslinkers (For Comparison):
Basonat® F 200 WD, a self-emulsifying isocyanate marketed by BASF AG for the crosslinking of aqueous dispersions.
Polyurethane Dispersion:
Luphen® D 200 A, an aqueous dispersion of a polyester polyurethane that is marketed by BASF for industrial lamination.
Preparation of the Adhesives
12.5 parts by weight of the crosslinker (solids, without water, solvents) per 100 by weight of polyurethane (solids, without water) were incorporated with stirring into the polyurethane dispersion Luphen D 200 A.
Industrial Furniture Lamination Testing:
38-40 g/m² (solids) of the adhesive were applied by spraying to a fiber molding with a three-dimensional surface, as used for producing furniture moldings, and dried. In a commercial vacuum thermoforming press (Bürkle Thermoformer), a PVC film (Roxan type 5371744 beech Taunus) was laminated on. Lamination took place with a hotplate temperature of 121° C. under a pressure of 4.5 bar; the pressure was maintained for 45 seconds. The vacuum time was approximately 6 s.

The molding obtained is laminated up to the edge with the film.

The laminate of molding and film was stored first at room temperature for 7 days. This was followed by storage at 75° C. to 90° C., the storage temperature being raised by 5° C. each hour, beginning at 75° C.

After each hour the edges of the molding were tested to ascertain whether and, if so, to what extent the laminated film had shrunk, i.e., how many mm the film edge had moved away from the edge of the molding toward the middle of the test specimen. The smaller this figure, the better the heat stability.

TABLE

| | Shrinkage of the film in millimeters | | | |
|---|---|---|---|---|
| Crosslinker | 75° C. | 80° C. | 85° C. | 90° C. |
| none | 1 | 2 | 2 | 3 |
| Basonat F 200 WD | 0.3 | 0.4 | 0.6 | 0.7 |
| silane 1 | 0.4 | 0.5 | 0.6 | 0.7 |
| silane 2 | 0.5 | 0.7 | 0.8 | 0.8 |

The table shows that the results achieved with the silanes are comparable to those with isocyanate crosslinkers.

The invention claimed is:

1. A method of permanently bonding extensive substrates with improved heat stability of the bonded substrates, wherein said extensive substrates are polymer films bonded to moldings, said method comprising:
adhesively bonding a plurality said polymer films to said moldings with an aqueous adhesive, said aqueous adhesive consisting essentially of
a polyurethane and a silane
wherein the silane is selected from the group consisting of 3-glycidyloxypropyltrimethoxysilane and 3-glycidoxypropyltriethoxysilane, and said silane is present in said adhesive in an amount ranging from 5 to 30 parts by weight of the silane per 100 parts by weight of polyurethane,
wherein the polyurethane comprises anionic carboxylate groups and is synthesized from at least 60% by weight of diisocyanates and polyesterdiols, said polyesterdiols are produced by reacting dihydric alcohols of the general formula HO—$(CH_2)_x$—OH, where x is a number from 1 to 20 with dibasic carboxylic acids of the general formula HOOC—$(CH_2)_y$—COOH, where y is a number from 1 to 20.

2. The method according to claim 1, wherein said aqueous adhesive further contains a silane of the formula

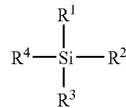

where $R^1$ to $R^4$ each independently are an organic radical, with the proviso that at least two of the groups $R^1$ to $R^4$ are a hydroxyl or alkoxy group.

3. The method according to claim 2, wherein two or three of the groups $R^1$ to $R^4$ are an alkoxy group.

4. The method according to claim 2, wherein at least one of the remaining groups $R^1$ to $R^4$ is an organic radical which comprises at least one functional group selected from the group consisting of a primary or secondary amino group, an acid group, an acid anhydride group, a carbamate group, an isocyanate group, a hydroxyl group or an epoxy group.

5. The method according to claim 1, wherein the polyurethane is dispersed in water and the adhesive thus constitutes an aqueous polyurethane dispersion.

6. The method according to claim 1, wherein said aqueous adhesive further contains a poly-urethane having sulfonate anionic groups.

7. The method according to claim 1, wherein the polyurethane has a melting point in the range from 30 to 150° C.

8. The method according to claim 7, wherein the melting point in the range is 40 to 100° C.

9. The method according to claim 1, wherein said aqueous adhesive is composed of at least 40% by weight of the polyurethane, based on the solids content.

10. The method according to claim 1, being a one-component (1 K) adhesive.

11. The method according to claim 1, wherein extensive substrates are selected from the group consisting of polymer films, paper, metal foils, wood veneer, and nonwoven webs of natural or synthetic fibers bonded to one another or to other moldings.

12. The method according to claim 1, wherein said silane is 3-glycidyloxypropyltrimethoxysilane.

13. The method according to claim 1, wherein said silane is 3-glycidoxypropyltriethoxysilane.

* * * * *